United States Patent
Petersson

(10) Patent No.: US 9,935,445 B2
(45) Date of Patent: Apr. 3, 2018

(54) WEDGE OF A TRANSITION FOR CABLES ETC

(71) Applicant: Roxtec AB, Karlskrona (SE)

(72) Inventor: Joakim Petersson, Nättraby (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 15/279,803

(22) Filed: Sep. 29, 2016

(65) Prior Publication Data

US 2017/0098927 A1    Apr. 6, 2017

(30) Foreign Application Priority Data

Oct. 6, 2015   (SE) ...................................... 1551281

(51) Int. Cl.
   *H02G 3/22*     (2006.01)
   *H05F 3/02*     (2006.01)
   *F16L 5/08*     (2006.01)

(52) U.S. Cl.
   CPC .................. *H02G 3/22* (2013.01); *F16L 5/08* (2013.01); *H05F 3/02* (2013.01)

(58) Field of Classification Search
   CPC ................. H02G 3/22; H05F 3/02; F16L 5/08
   USPC ................................... 174/658, 60
   See application file for complete search history.

(56) References Cited

U.S. PATENT DOCUMENTS

| | | | | |
|---|---|---|---|---|
| 2007/0252341 A1* | 11/2007 | Kreutz | ...................... | F16L 5/08 277/605 |
| 2010/0175271 A1* | 7/2010 | Lundborg | .................. | F16L 5/08 33/613 |
| 2012/0073872 A1* | 3/2012 | Hildingsson | .............. | F16L 5/08 174/362 |

FOREIGN PATENT DOCUMENTS

| | | |
|---|---|---|
| CN | 101068073 A | 11/2007 |
| CN | 202188235 U | 4/2012 |
| CN | 203215092 U | 9/2013 |
| DE | 10325732 B3 | 11/2004 |
| EP | 1484541 A1 | 12/2004 |
| KR | 10-1223090 B1 | 1/2013 |
| WO | WO 2005/073607 A1 | 8/2005 |
| WO | WO 2008/010755 A1 | 1/2008 |
| WO | WO 2010/147534 A1 | 12/2010 |

OTHER PUBLICATIONS

Search Report for European Patent Application No. 16190107.9, dated Feb. 2, 2017.
Search Report for Singaporean Patent Application No. 10201608213U, dated Jun. 9, 2017.

* cited by examiner

*Primary Examiner* — Timothy Thompson
*Assistant Examiner* — Charles Pizzuto
(74) *Attorney, Agent, or Firm* — Merchant & Gould P.C.

(57) ABSTRACT

The disclosure concerns a compression unit, in the form of wedge, of a transition for cables, pipes or wires. The wedge is to be placed inside a frame together with a number of compressible modules, which modules are to receive cables etc. The wedge comprises a number of wedge elements. The wedge is moved between non activated and activated positions by means of a screw, received in a through opening of a first wedge element, and a sleeve, received in an opening of a second wedge element. The wedge further comprises at least one clip, of an electrically conductive material, placed inside the wedge. The at least one clip is placed to connect the screw with the frame to connect the screw to earth.

16 Claims, 3 Drawing Sheets

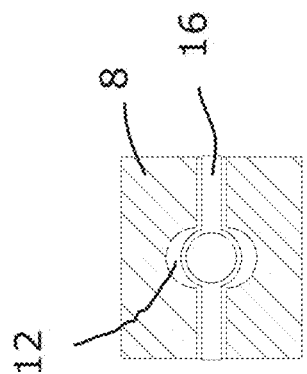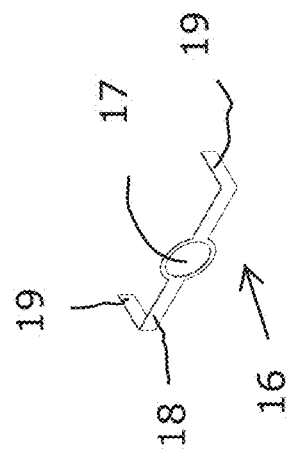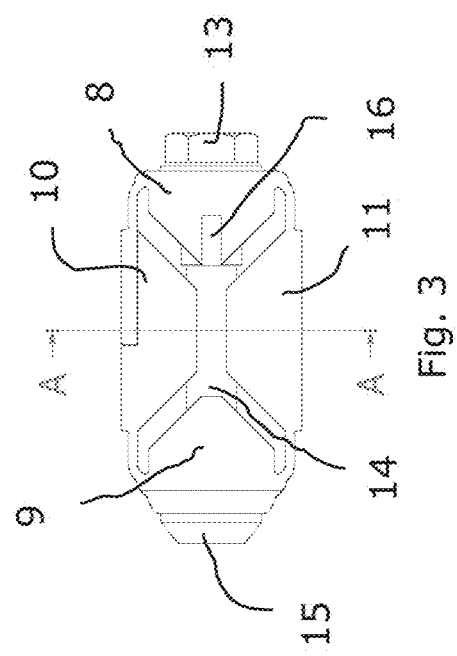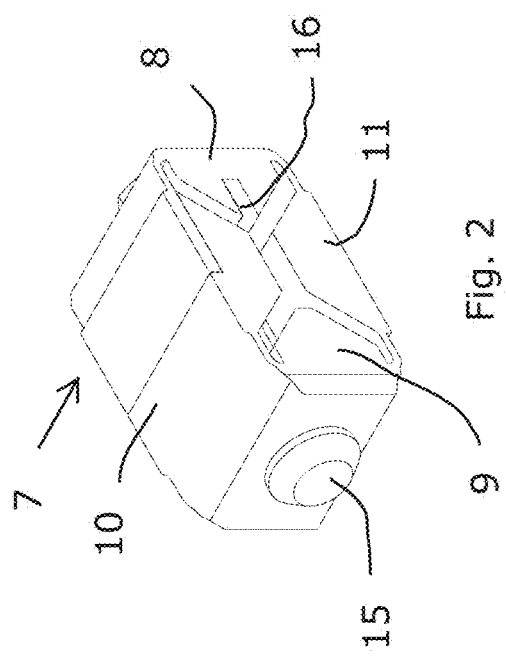

WEDGE OF A TRANSITION FOR CABLES ETC

This application claims benefit of 1551281-7, filed 6 Oct. 2015 in Sweden, which application is incorporated herein by reference. To the extent appropriate, a claim of priority is made to the above disclosed application.

TECHNICAL FIELD

The present invention concerns protection against electrostatic discharge in a compression unit of a transition for cables, pipes or wires.

BACKGROUND

The present invention has been developed in view of transitions having a frame, in which frame a number of modules, for receiving separate cables, pipes or wires, and at least one compression unit are placed. Often the compression unit has the form of a so-called wedge, comprising a number of interacting wedge elements. Such wedges have normally one or more screws to activate the compression unit.

There is a risk that electrically conductive material builds up static charges. Such static charges might discharge at contact with a different potential. This could lead to ignition of possible hazardous gases present.

The one or more screws of the compression unit should be connected to earth in order to avoid the risk of an undesired electrostatic discharge. It is previously known to solve this problem by connecting the one or more screws to an external conductor.

SUMMARY

One object of the invention is to avoid that electrically conductive material builds up a static charge, which might cause a discharge at a contact with a part of a different potential.

One further object of the invention is to solve the problem in a way facilitating handling, and a fitter should not need to take any special measures to solve the problem. The solution is an integrated part of the compression unit, which functions directly at installation.

By means of the present invention the one or more screws of the compression unit is connected to the frame of the transition, by means of one or more clips. Thus, by means of said clips, being part of the compression unit, the one or more screws are connected to earth.

Further objects and advantages of the present invention will be obvious to a person skilled in the art when reading the detailed description below.

BRIEF DESCRIPTION OF THE DRAWINGS

The invention will be explained further below by way of example and with reference to the enclosed drawings. In the drawings:

FIG. 2 is a perspective view of a first embodiment of a wedge according to the present invention, FIG. 3 is a side view of the wedge of FIG. 2, FIG. 4 is a cross sectional view taken along the line A-A in FIG. 3, FIG. 5 is a perspective view of a clip forming a part of the wedge of FIGS. 2 to 4.

DETAILED DESCRIPTION

Figure 1:
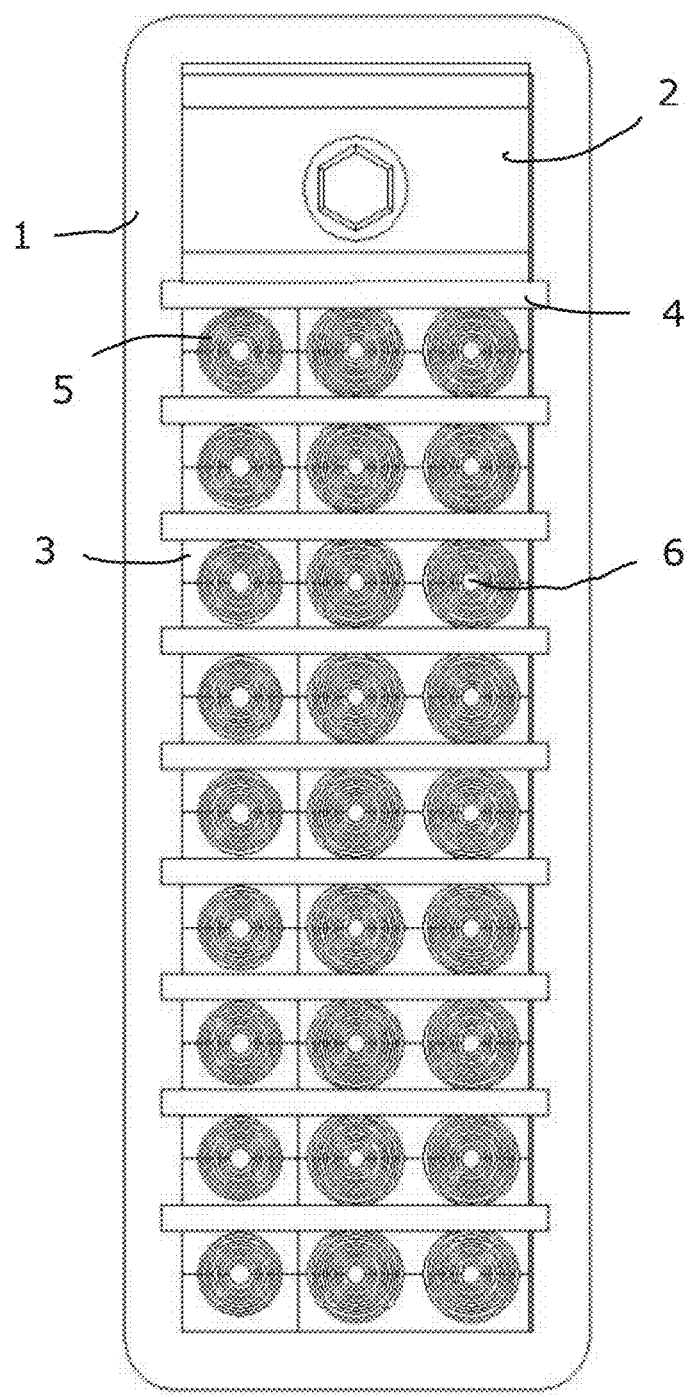
FIG. 1 is a front view of a transition for cables, pipes or wires.
Figure 8:
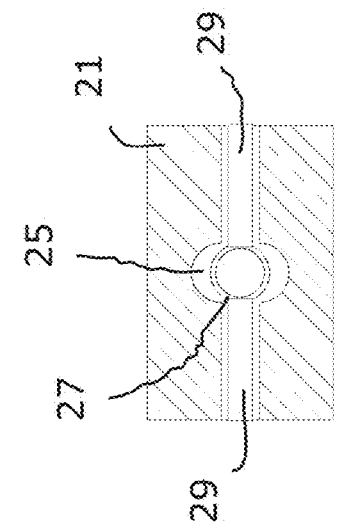
FIG. 8 is a cross sectional view taken along the line A-A in FIG. 7.
Figure 9:
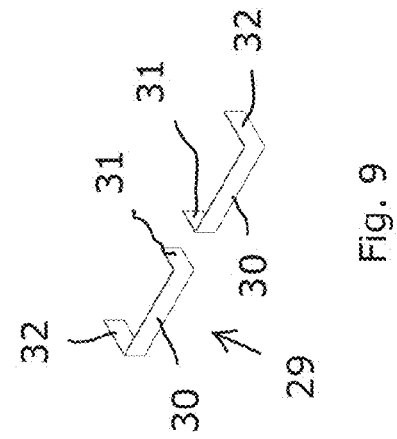
FIG. 9 is a perspective view of two clips forming a part of the wedge of FIGS. 6 to 8.
Figure 7:
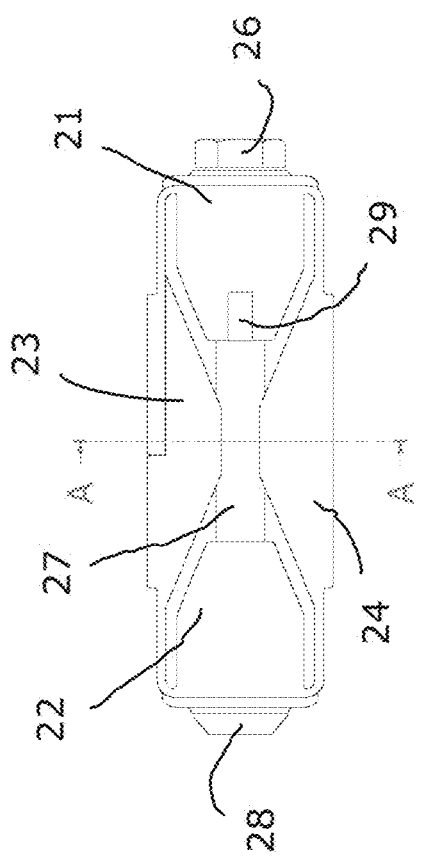
FIG. 7 is a side view of the wedge of FIG. 6.
Figure 6:
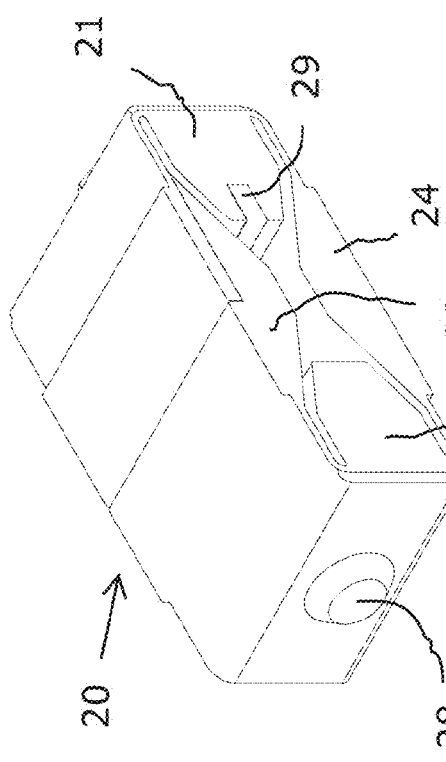
FIG. 6 is a perspective view of a second embodiment of a wedge according to the present invention.

FIG. 1 shows one example of a setting in which a compression unit is used. The shown example is a transition for sealed transfer of cable, pipes or wires through a wall or the like. It is commonly known to use this kind of transitions. It comprises a steel frame 1, often placed in a wall. Inside the frame 1 a compression unit, often called a wedge 2, is placed together with a number of modules 3 and stay plates 4. Each module 3 is formed of two halves and has a number of peelable layers 5, for adaptation to the outer diameter of the cable, pipe or wire to be received. Each module 3 has a central plug 6, which is removed when a cable, pipe or wire is to be received. If no cable, pipe or wire is to be received in a specific module 3, the central plug 6 is left inside the module when inserted inside the frame 1. The stay plates 4 are used to keep the modules 3 safely inside the frame 1. The wedge 2 is activated to compress the modules 3. By expanding the wedge 2 the modules 3 will be compressed in one direction, leading to expansion in other directions, which will give a sealing effect around any cable, pipe or wire received inside a module 3. There will also be a sealing effect in view of the frame 1. This kind of sealing effect is well known to a person skilled in the art.

In a first embodiment of a compression unit or wedge 7, which could be used in a transition as described above, the wedge 7 comprises four wedge elements 8, 9, 10, 11. The four wedge elements 8, 9, 10, 11 could be made as one single unit, see e.g. WO 96/11353. Of said four wedge elements, a first wedge element 8 is placed opposite a second wedge element 9 in a common plane. The first and second wedge elements 8, 9 have upper and lower inclined surfaces and said inclined surfaces incline downwards towards the other of said first and second wedge elements 8, 9. Of the four wedge elements a third wedge element 10 and a fourth wedge element 11 are placed on opposite sides of the first and second wedge elements 8, 9. Each of the third and fourth wedge elements 10, 11 has two inclined surfaces which are placed adjacent one inclined surface of the first wedge element 8 and the second wedge element 9, respectively. The first and second wedge elements 8, 9 are arranged moveable towards and away from each other, by means of an arrangement of a screw 13 and a sleeve 14. The screw 13 goes through a through opening 12 of the first wedge element 8. The sleeve 14, having an outer end 15, is received and fastened in a through opening of the second wedge element 9 in the shown embodiment. The outer end 15 of the sleeve 14 has a larger outer diameter than the through opening of the second wedge element 9. The second wedge element 9 and the sleeve 14 will move as one unit in relation to the screw 13 and the first wedge element 8. In other embodiments the sleeve 14 is received and fastened in an opening not going all the way through the second wedge element 9. The sleeve 14 has an inner thread for cooperation with an outer thread of the screw 13. By turning the screw 13 in a first direction the screw 13 is screwed deeper into the sleeve 14, shortening the distance between the first wedge element 8 and the second wedge element 9. By screwing the screw 13 in a second direction the screw 13 is screwed in a direction out of the sleeve 14, increasing the distance between the first wedge element 8 and the second wedge element 9. When the distance between the first and second wedge elements 8, 9 is decreased the third and fourth wedge elements 11, 12 are moved away from each other, due to the inclined surfaces of the four wedge elements 8, 9, 10, 11. When the distance between the first and second wedge elements 8, 9 is increased the third and fourth wedge elements 10, 11 are moved towards each other, due to the inclined surfaces of the four wedge elements 8, 9, 10, 11.

In use the wedge 7 is inserted inside the frame in a non-activated position. In the non-activated position the first and second wedge element 8, 9 are far from each other, while the third and fourth wedge elements 10, 11 are close to each other. With all cables, pipes or wires placed inside one or more of the modules 3 inside the frame 1, the wedge 7 is moved into an activated position by means of the screw 13. In the activated position the first and second wedge elements 8, 9 are moved towards each other and the third and fourth wedge elements 10, 11 are moved away from each other. With the wedge 7 placed as indicated in FIG. 1, the third wedge element 10 will be pressed against the frame 1 in the activated position, at the same time as the fourth wedge element 11 will be pressed downwards. As the modules 3 are of a compressible material they will thereby be pressed against each other, against the cables etc. and the frame 1.

On the inside of the wedge 7, a clip 16 is placed. The clip 16 is made of an electrically conductive material. The clip 16 has a central through opening 17 placed on an elongated central part 18. At opposite ends of the elongated central part 18, there are two end parts 19, bent in right angles to the central part 18. The two end parts 19 are directed in the same direction in view of the central part 18. The central part 18 and the bent end parts 19 are made in one piece. The clip 16 is placed at the first wedge element 8 of the wedge 7, with the bent ends 19 of the clip 16 placed at opposite sides of the first wedge element 8. In use the opening 17 of the clip 16 is to be placed at the end of and abutting the sleeve 14 of the wedge 7. When the wedge 7 is activated in that the first and second wedge elements 8, 9 are moved towards each other, the sleeve 14 will be pressed against the clip 16, whereby the bent ends 19 of the clip 16 will be pressed against the inner sides of the frame 1. The screw 13 will thereby be connected to earth, as the screw 13 is connected to the sleeve 14.

In use the screw 13 is automatically connected to earth in the activated position of the wedge 7, without a fitter having to do anything in addition to the normal handling of wedges of this kind.

A second embodiment of a wedge 20 has basically the same design as the wedge 7 of the first embodiment. Thus, the wedge 20 has a first wedge element 21, a second wedge element 22, a third wedge element 23 and a fourth wedge element 24. The wedge 20 has further a screw 26 and a sleeve 27, cooperating by means of threads with the screw 26. The sleeve 27 has an outer free end 28. The wedge elements 21-24 have inclined surfaces in mutual contact in the same way as previously described. The screw 26 is received in a through opening 25 of the first wedge element 21 and the sleeve 27 is received and fastened in a through opening of the second wedge element 22. In a way corresponding to the previously described wedge 7, the first and second wedge elements 21, 22 are moved towards and away from each other depending on the direction of rotation for the screw 26 in the sleeve 27. When the first and second wedge elements 21, 22 are moved towards each other, the third and fourth wedge elements 23, 24 are forced further apart. When the first and second wedge elements 21, 22 are moved away from each other the third and fourth wedge elements 23, 24 are moved towards each other.

In use the wedge 20 is placed inside the frame in a non-activated position, in which the first and second wedge elements 21, 22 are far from each other. The wedge 20 is then moved to an activated position by means of the screw 26, whereby the first and second wedge elements 21, 22 are moved towards each other, forcing the third and fourth wedge elements 23, 24 away from each other.

On the inside of the wedge 20, two clips 29 are placed. Said clips 29 are identical in the shown embodiment, but turned 180°. Each clip 29 has an elongated central part 30 and two end parts 31, 32 at opposite ends of the central part 30. The two end parts 31, 32 are bent in right angles to the central part 30 and are directed in the same direction in view of the central part 30. One of the end parts 31 projects a shorter distance from the central part 30 than the other end part 32. Thus, there is a shorter end part 31 and a longer end part 32. The central part 30 and the end parts 31, 32 are made in one piece. Each clip 29 is placed on the first wedge element 21 of the wedge 20, with the shorter bent end 31 placed inside the through opening 25 of the first wedge element 21, between the sleeve 22 of the wedge 20 and the inner surface of the through opening of the first wedge element, and with the longer bent end 32 placed at the side of the first wedge element 21, between the first wedge element 21 and the frame 1. Thus, in view of the first wedge element 21, the shorter bent end 31 could be said to be placed at an inner position while the longer bent end 32 could be said to be placed at an outer position. When the wedge 20 is activated and the first and second wedge elements 21, 22 are moved towards each other, the shorter bent end 31 of each clip 29 will be pressed against the sleeve 27 and the longer bent ends 32 of each clip 29 will be pressed against the inner sides of the frame 1. Thus, the two clips 29 abut opposite sides of the frame 1. The screw 26 will thereby be connected to earth as the screw 26 is connected to the sleeve 27.

A person skilled in the art realizes that the wedges 7, 20 and clips 16, 29 are interchangeable. Thus, either of the clips 16, 29 can be used with the wedge 7 of the first embodiment and the wedge 20 of the second embodiment, respectively.

The invention claimed is:

1. A wedge for use with a transition for cables, pipes or wires, wherein the transition comprises a frame and modules, the wedge and modules are placed inside the frame, and each of the modules is configured to receive a cable, pipe or wire, and the wedge comprises:
wedge elements, that move from a non-activated position to an activated position and vice versa by means of a first wedge element and a second wedge element being moved towards each other or away from each other, respectively, wherein the movement of the first wedge element and the second wedge element is accomplished by means of a screw received inside a sleeve, so that an outer thread of the screw co-operates with an inner thread of the sleeve, and the screw is received in a through opening of the first wedge element, and the sleeve is received in an opening of the second wedge element, and the frame comprises an electrically conductive material, and the wedge further comprises at least one clip of an electrically conductive material placed inside the wedge, and connecting the screw with the frame and to a ground.

2. The wedge of claim 1, wherein the at least one clip is placed on the first wedge element and wherein the at least one clip abuts the sleeve receiving the screw.

3. The wedge of claim 1, wherein each clip is made in one piece.

4. The wedge of claim 1, wherein there is one clip.

5. The wedge of claim 4, wherein the clip has a central elongated part, with a central through opening, and two bent end parts at opposite ends of the central part and which bent end parts are bent in a same direction.

6. The wedge of claim 5, wherein the two bent end parts are bent at right angles in relation to the central part of the clip.

7. The wedge of claim 5, wherein the clip is placed on the first wedge element with the central through opening in contact with the sleeve and the bent end parts in contact with opposite sides of the frame in an activated condition for the wedge.

8. The wedge of claim 1, wherein at least one clip comprises two identical clips.

9. The wedge of claim 8, wherein each of the two clips has an elongated central part and two bent parts at opposite ends of the central part, which bent parts are bent in a same direction.

10. The wedge of claim 9, wherein the bent parts are bent at right angles in relation to the central part.

11. The wedge of claim 9, wherein one of the bent ends projects at shorter distance from the central part than the other bent end.

12. The wedge of claim 9, wherein each clip is placed with one bent end placed inside the through opening of the first wedge element, abutting the sleeve receiving the screw, and with the other bent end abutting an inside of the frame, in an activated condition for the wedge.

13. The wedge of claim 12, wherein the two clips abut opposite sides of the frame.

14. The wedge of claim 12, wherein the bent end of each clip projecting a shorter distance from the central part, is placed inside the through opening of the first wedge element.

15. The wedge of claim 1, wherein the wedge elements comprise a third wedge element and a fourth wedge element.

16. The wedge of claim 15, wherein the third wedge element and the fourth wedge element are placed on opposition sides of the first wedge element and the second wedge element.

* * * * *